(12) United States Patent
Liu (10) Patent No.: US 7,673,911 B2
(45) Date of Patent: Mar. 9, 2010

(54) SAFETY TYPE QUICK CONNECTOR

(76) Inventor: Hsiu-Hsiung Liu, 27F-2, No. 797, Jhongjheng Rd., Jhonghe City, Taipei Hsien (TW)

( * ) Notice: Subject to any disclaimer, the term of this patent is extended or adjusted under 35 U.S.C. 154(b) by 115 days.

(21) Appl. No.: 12/043,254

(22) Filed: Mar. 6, 2008

(65) Prior Publication Data

US 2009/0224534 A1 Sep. 10, 2009

(51) Int. Cl.
*F16L 37/18* (2006.01)
(52) U.S. Cl. .................. 285/316; 285/276; 285/397; 285/924
(58) Field of Classification Search ............ 285/13, 285/276, 277, 307, 308, 315, 316, 317, 318, 285/397, 924; 403/322.2; 137/614.03, 614.05
See application file for complete search history.

(56) References Cited

U.S. PATENT DOCUMENTS 3,076,671 A * 2/1963 Freeman .................. 285/277

4,114,853 A * 9/1978 Medvick .................. 251/149.6

\* cited by examiner

*Primary Examiner*—Daniel P Stodola
*Assistant Examiner*—Gwendolyn Fournet
(74) *Attorney, Agent, or Firm*—Rahman LLC (57) ABSTRACT

A safety type quick connector has a body, a socket base, a moving base, a pushing assembly, an outer sleeve, multiple springs, multiple first balls and second balls. The socket base is connected to the tubular body and has an inserting end, a connecting end, multiple ball slots and ball bores. The moving base is movably mounted in the socket chamber and has a closed end, an open end, a sealing flange, multiple ball holes and at least one vent. The sealing flange is formed around the closed end and abuts against and closes the connecting end of the socket base. The pushing assembly is movably mounted in the moving base. Accordingly, the moving base can be kept stationary when a plug is inserted into the connector and pushes the pushing assembly to move, and this can keep air from leaking.

12 Claims, 9 Drawing Sheets

SAFETY TYPE QUICK CONNECTOR

BACKGROUND OF THE INVENTION

1. Field of the Invention

The present invention relates to a connector, and more particularly to a safe type quick release connector that can prevent pressured air from leaking.

2. Description of Related Art

Quick release connectors are always used in pipe connections, such as pneumatic tool systems to connect a pneumatic tool to a pressured air source. A conventional quick release connector comprises multiple steel balls for engaging recesses in a plug. With the engagement between the balls and recesses, two pipes can be connected with the connector. Additionally, because the connector is connected to a pressured air source, the conventional quick connector always has a sealing device to close the path to the pressured air source and keep air from leaking before connection.

However, when a plug is inserted into the conventional connector, the sealing device will be opened even before the plug engaging the balls. Therefore, the pressured air will discharge from the connector before the plug being completely engaging the connector, to connect the connector with the plug is difficult and laborious especially to a person who does not have enough powerful strength.

When the plug is released from the connector, an outer sleeve of the conventional connector is pulled to disengage the balls from the recesses in the plug and the plug can be detached from the connector. However, during the detaching process, the pressured air is keeping flowing to the connector but not sealed. Thus, the pressured air will apply a huge force to the pipe with the connector, and the user cannot securely hold the pipe with the connector so that the pipe easily injures the user when the pipe is unintentionally released from the user due to the pressured air.

To overcome the shortcomings, the present invention tends to provide a safety type quick release connector to mitigate or obviate the aforementioned problems.

SUMMARY OF THE INVENTION

The main objective of the invention is to provide a quick release connector that can keep pressured air from leaking during the connection process.

The quick-release connector comprises a body, a socket base, a moving base, a pushing assembly, an outer sleeve, multiple springs, multiple first balls and second balls. The body is tubular and has an open input end, an open output end and a body chamber communicating with the input and output ends. The socket base is hollow, is connected to the tubular body and has a peripheral wall, an inserting end, a connecting end, a socket chamber, an annular lip, multiple elongated ball slots and multiple ball bores. The peripheral wall has at least one longitudinal flat facet. The connecting end is connected to the output end of the tubular body. The socket chamber is formed in the socket base and communicates with the inserting and connecting ends The annular lip is formed on and protrudes inward from the inserting end and has an inserting hole with a diameter. The elongated ball slots are longitudinally formed through the peripheral wall, are arranged in a circle around the socket base and communicate with the socket chamber. The ball bores are formed through the peripheral wall, are arranged in a circle around the socket base and communicate with the socket chamber. The moving base is movably mounted in the socket chamber and has a peripheral wall, a closed end, an open end, a base chamber, a sealing flange, multiple ball holes and at least one vent. The closed end corresponds to the connecting end of the socket base. The open end corresponds to and abuts with the annular lip on the inserting end of the socket base. The base chamber is formed in the moving base and communicates with the open end. The sealing flange is formed around the closed end and abuts against and closes the connecting end of the socket base. The annular groove is defined around the peripheral wall of the moving base. The ball holes are defined through the peripheral wall of the moving base, communicate with the base chamber and correspond respectively to the ball slots in the socket base. The at least one vent is defined through the peripheral wall at a position between the sealing flange and the open end of the moving base and communicates with the base chamber. The pushing assembly is movably mounted in the base chamber of the moving base and comprises a collar and a first seal. The collar is movably mounted in the base chamber and has an abutting end abutting with the lip on the socket base. The first seal is tubular and resilient and is mounted in the collar. The outer sleeve is slidably mounted around the socket base and comprises a central hole, a ball cavity and multiple longitudinal ball recesses. The central hole is defined through the outer sleeve and has a diameter and an inner surface. The ball cavity is defined in one end of the outer sleeve, corresponds to the ball slots in the socket base and has a diameter larger than that of the central hole of the outer sleeve. The elongated ball recesses are longitudinally formed in the inner surface of the central hole, communicate with the ball cavity and correspond respectively to the ball bores in the socket base. The first spring is mounted in the tubular body and has two ends abutting respectively with the tubular body and the moving base. The second spring is mounted in the moving base and has two ends abutting respectively with the moving base and the pushing assembly. The third spring has two ends abutting respectively with the tubular body and the outer sleeve. Each first ball is held in one of the ball slots in the socket base and a corresponding one of the socket holes in the moving base and abuts the collar. The second balls are held respectively in the ball bores in the socket base and abut the peripheral wall of the moving base.

Other objects, advantages and novel features of the invention will become more apparent from the following detailed description when taken in conjunction with the accompanying drawings.

DETAILED DESCRIPTION OF PREFERRED EMBODIMENT

With reference to FIGS. 1 to 4, a safety type quick connector in accordance with the present invention comprises a body (10), a socket base (20), a moving base (40), a pushing assembly (50), an outer sleeve (30), multiple springs (15,18,19), multiple first balls (27) and second balls (28).

The body (10) is tubular and hollow and has an open input end (100), an open output end (101) and a body chamber (11) communicating with the input and output ends (100,101). An inner thread (12) is formed in the output end (101).

The socket base (20) is hollow is connected to the tubular body (10) and has a peripheral wall, an inserting end (201), a connecting end (200), a socket chamber (23), an annular lip (22), an outer flange (21), multiple elongated ball slots (24) and multiple ball bores (25). The peripheral wall may have a polygonal cross section and has at least one longitudinal flat facet In a preferred embodiment, the peripheral wall has multiple flat facets and curved facets alternatively and longitudinally formed on the peripheral wall The connecting end (200) is connected to the output end (101) of the tubular body (10) In the preferred embodiment, the connecting end (200) has an outer thread screwed with the inner thread (12) in the output end (101) of the body (10) to connect the socket base (20) with the body (10) together. The socket chamber (23) is formed in the socket base (20) and communicates with the connecting and inserting ends (200,201).

The annular lip (22) is formed on and protrudes inward from the inserting end (201) and has an inserting hole with a diameter. The outer flange (21) is formed around the inserting end (201). The elongated ball slots (24) are longitudinally formed through the peripheral wall near the outer flange (21), are arranged in a circle around the socket base (20) and communicate with the socket chamber (23) The ball bores (25) are formed through the peripheral wall, are arranged in a circle around the socket base (20) and communicate with the socket chamber (23). In the preferred embodiment, the ball slots (24) are defined respectively in the flat facets, and the ball bores (25) are defined respectively in the curved facets alternatively between the ball slots (24).

In additionally, the socket base (20) further comprises at least one releasing hole (26) defined through the peripheral wall of the socket base (20) and communicating with the socket chamber (23). In the preferred embodiment, the socket base (20) has multiple the releasing holes (26) defined respectively in the flat facets.

The moving base (40) is movably mounted in the socket chamber (23) and has a peripheral wall, a closed end (400), an open end (401), a base chamber, a sealing flange (41), an annular groove (45), multiple ball holes (46) and at least one vent (44).

The closed end (400) corresponds to the connecting end (200) of the socket base (20). The open end (401) corresponds to and abuts with the annular lip (22) on the inserting end (201) of the socket base (20) and communicates with the inserting hole in the socket base (20). The base chamber is formed in the moving base (40) and communicates with the open end (401). The base chamber may be composed of a front chamber (43) near the open end (401) and a rear chamber (42) near the closed end (400) and having a diameter smaller than that of the front chamber (43), such that a shoulder is formed between the front chamber (43) and the rear chamber (42).

The sealing flange (41) is formed around the closed end (400) and abuts against and closes the connecting end (200) of the socket base (20).

The annular groove (45) is defined around the peripheral wall near the open end (401) of the moving base (40) and has a bottom.

The ball holes (46) are defined through the peripheral wall of the moving base (40), preferably through the bottom of the annular groove (45), communicates with the base chamber and corresponds respectively to the ball slots (24) in the socket base (20) in numbers and positions.

The at least one vent (44) is defined through the peripheral wall at a position between the sealing flange (41) and the open end (401) of the moving base (40) and communicates with the base chamber.

The pushing assembly (50) is movably mounted in the base chamber of the moving base (40) and comprises a collar (51), a first seal (52) and a second seal (53).

The collar (51) is movably mounted in the base chamber and has an abutting end (510) abutting with the lip (22) on the socket base (20) and an annular abutting lip. The annular abutting lip is formed on and protrudes inward from the abutting end (510) to define a hole with a diameter. In the preferred embodiment, the diameter of the inserting hole in the socket base (20) is larger than that of the hole in the collar (51) but is smaller than that of the collar (51).

The first seal (52) is tubular and resilient and is mounted in the collar (51). The first seal (52) has a central hole having multiple segments with different inner diameters and a front end and a rear end. The front end of the first seal (52) securely abuts against the abutting lip on the collar (51).

The second seal (53) is resilient and is attached to the rear end of the first seal (52). The second seal (53) may have an inner diameter different from the diameters of the central hole of the first seal (52).

The outer sleeve (30) is slidably mounted around the socket base (20) and comprises a central hole (32), a ball cavity (31) and multiple ball recesses (320). The central hole (32) is defined through the outer sleeve (30) and has a diameter, an inner surface and at least one flat facet. The at least one flat facet is formed on the inner surface of the central hole (32) and respectively corresponds to and abuts the at least one facet in the socket base (20). With the flat facets on the socket base (20) and the outer sleeve (30), the outer sleeve (30) is kept from rotating but allowed to slide relative to the socket base (20).

The ball cavity (31) is defined in one end of the outer sleeve (30), corresponds to the ball slots (24) in the socket base (20) and has a diameter larger than that of the central hole (32) of the outer sleeve (30). The elongated ball recesses (320) are longitudinally formed in the inner surface of the central hole (32), communicates with the ball cavity (31) and correspond respectively to the ball bores (25) in the socket base (20) in numbers and positions.

The first spring (15) is mounted in the tubular body (10) and has two ends abutting respectively with the tubular body (10) and the sealing flange (41) of the moving base (40) to provide the moving base (40) with a force for pushing the sealing flange (41) to abut against and close the connecting end (200) of the socket base (20).

The second spring (18) is mounted in the base chamber of the moving base (40) and has two ends abutting respectively with the moving base (40) and the pushing assembly (50) to make the abutting end (501) of the collar abutting against the lip (22) on the socket base (20). In the preferred embodiment, the ends of the second springs (18) abut respectively with the shoulder in the base chamber and the second seal (53).

The third spring (19) is mounted around the socket base (20) and has two ends abuts respectively with the tubular body (10) and the outer sleeve (30) to provide a force to the outer sleeve (30) to move toward the inserting end (201) of the socket base (20).

Each first ball (27) is held in one of the ball slots (24) in the socket base (20) and a corresponding one of the ball holes (46) in the moving base (40) and abuts the collar (51). The first balls have a diameter smaller than that of the ball holes (46) to allow the first balls (27) to partially enter the base chamber.

The second balls (28) are held respectively in the ball bores (25) in the socket base (20) and abut the peripheral wall of the moving base (40). In the preferred embodiment, the second balls (28) have a diameter smaller than that of the first balls (27).

Figure 1:
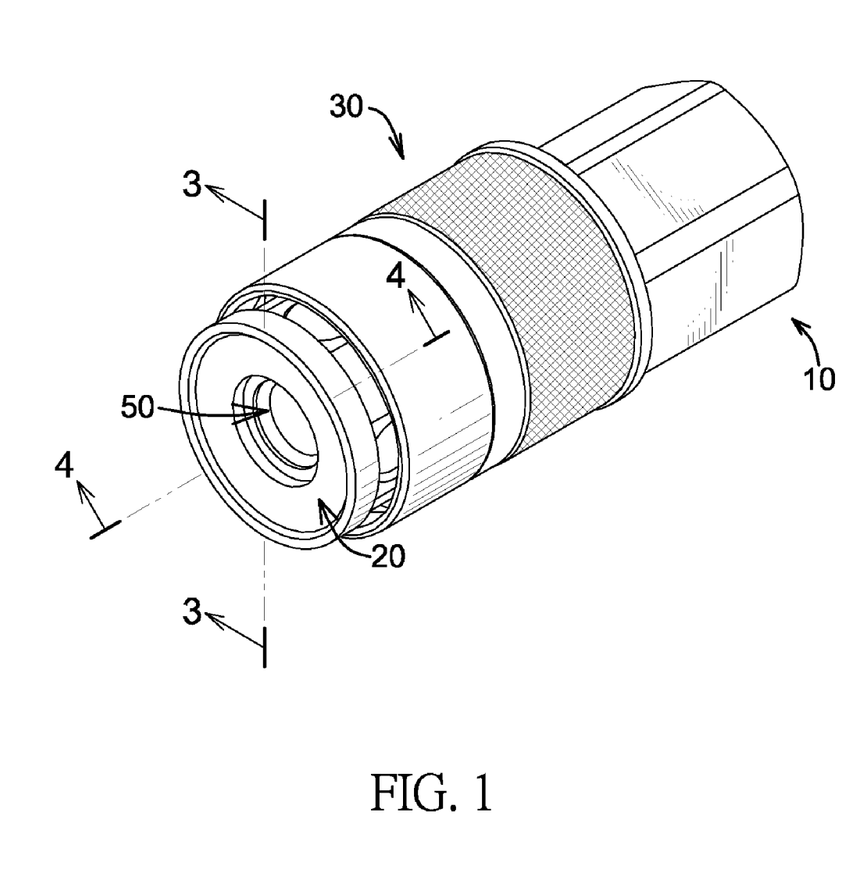
FIG. 1 is a perspective view of a safety type quick connector in accordance with the present invention.
Figure 2:
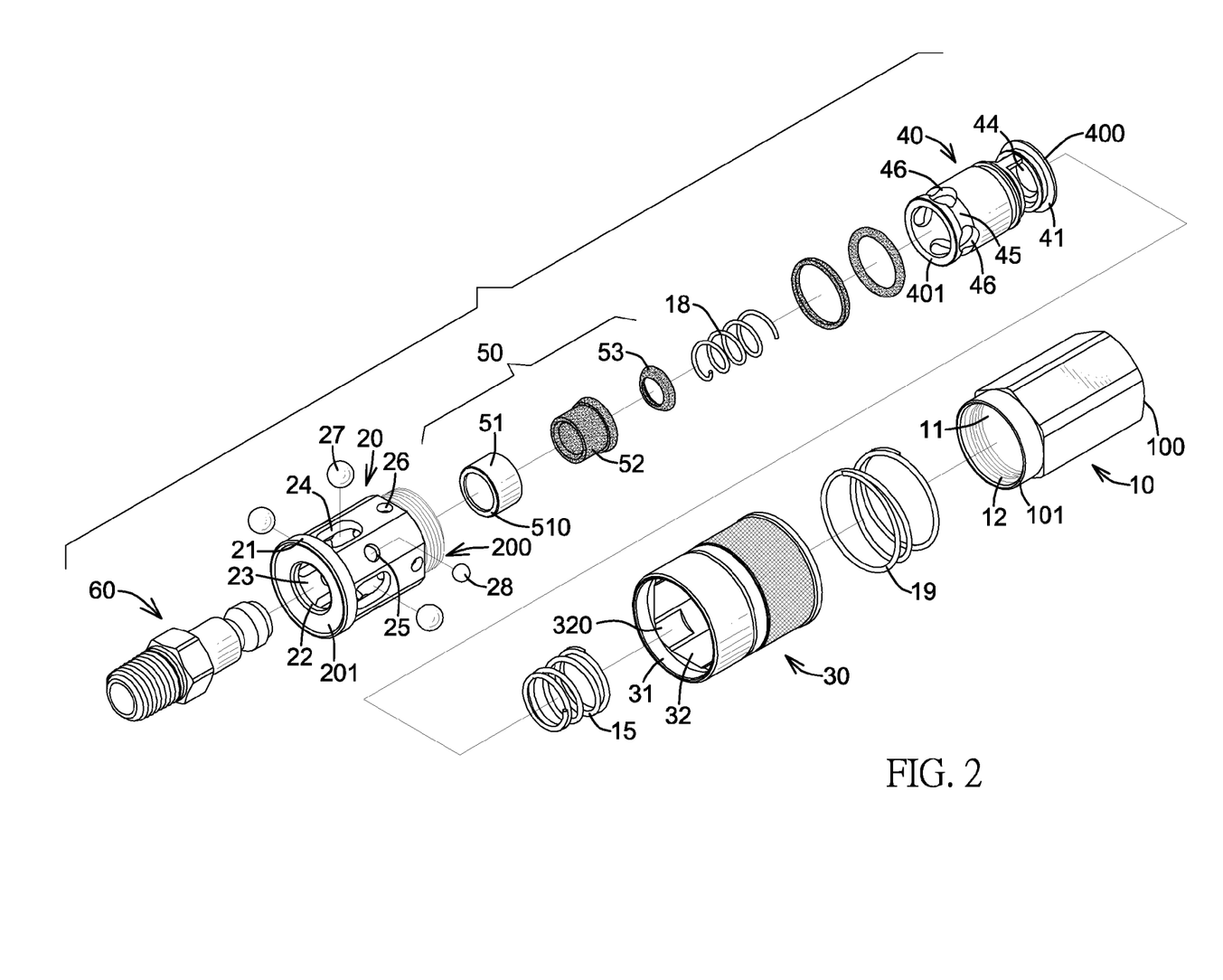
FIG. 2 is an perspective view of the quick connector in FIG. 1.
Figure 3:
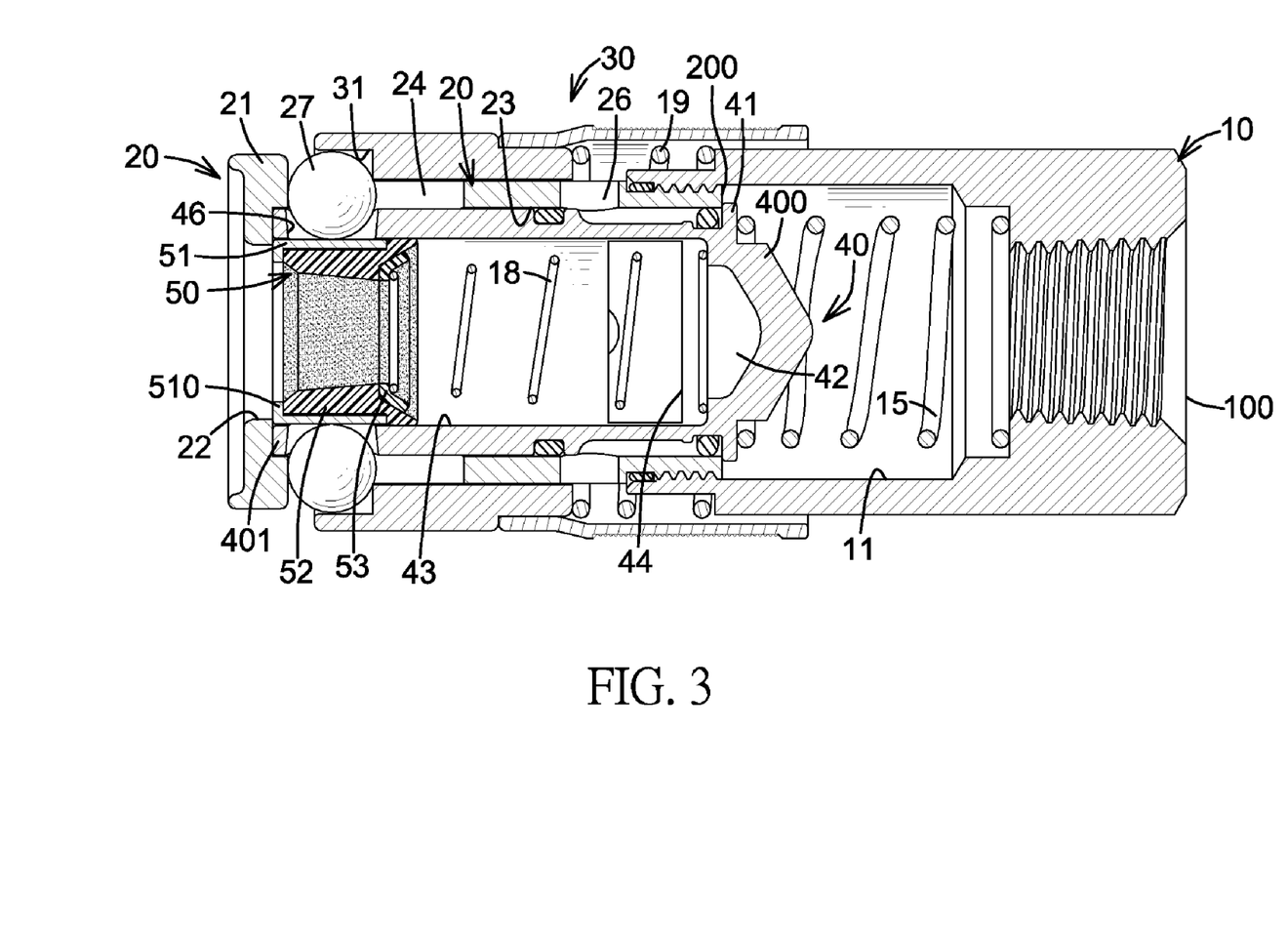
FIG. 3 is a side view in partial section of the quick connector along line 3-3 in FIG. 1.
Figure 4:
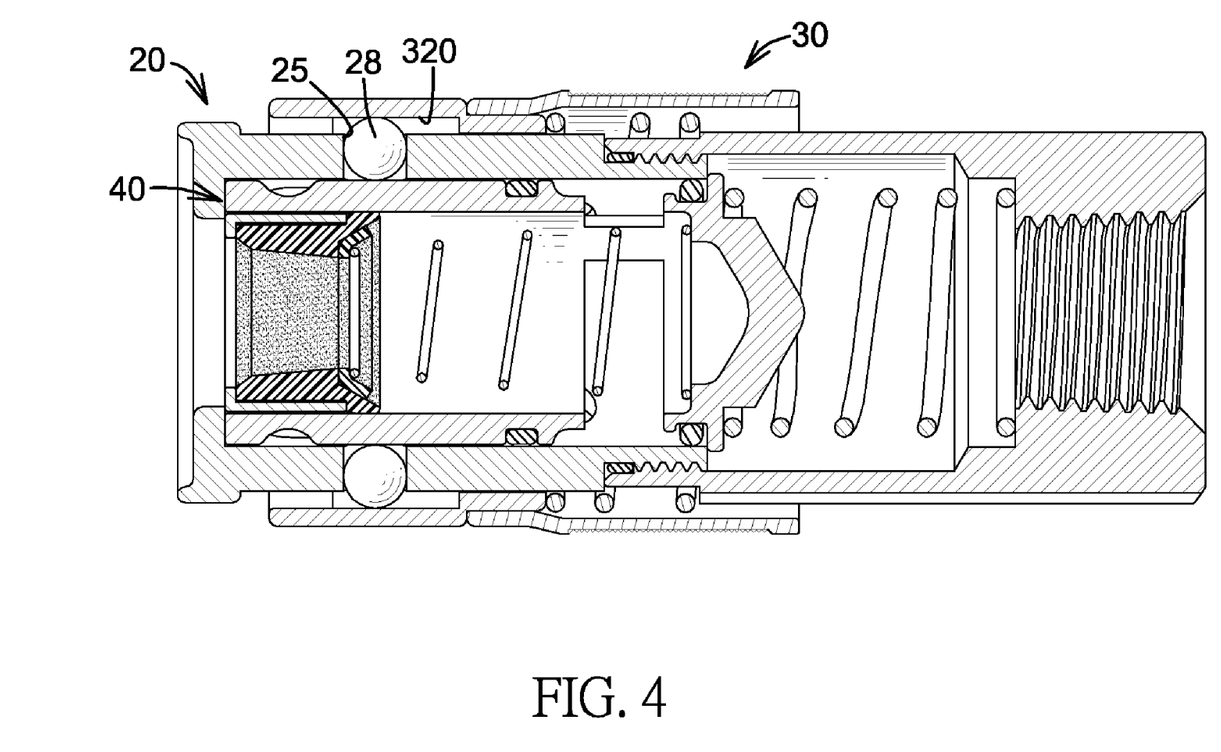
FIG. 4 is another side view in partial section of the quick connector along line 4-4 in FIG. 1.

In use, the input end (100) of the body (10) is connected to a pressured air source with a pipe. Before the connector being connected with a plug, the pressured air will be blocked by the closed end (400) and the sealing flange (41) of the moving base (40) and is kept from leaking. At this time, the first balls are squeezed between the ball cavity (31) in the outer sleeve (30) and the collar (51) and are kept from moving and entering into the base chamber.

Figure 5:
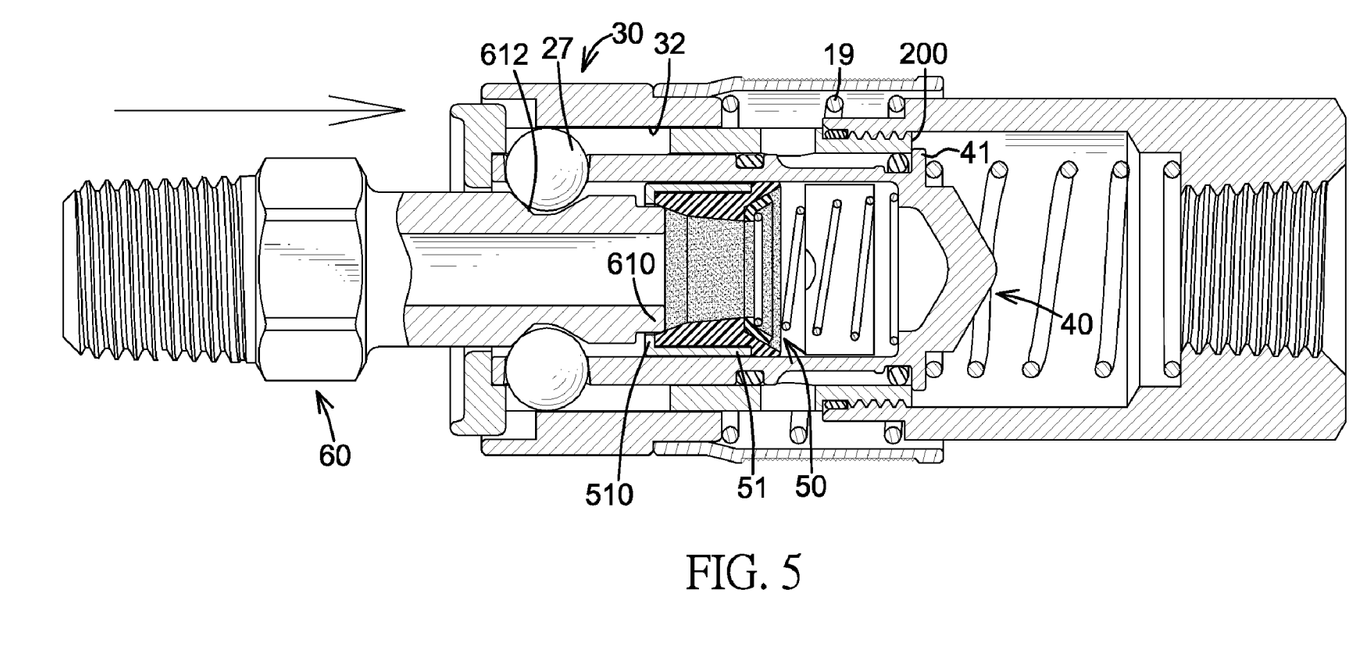
FIG. 5 is an operational side view in partial section of the quick connector in FIG. 1 showing a plug being inserted into the connector but the connecting keeping sealed.
Figure 6:
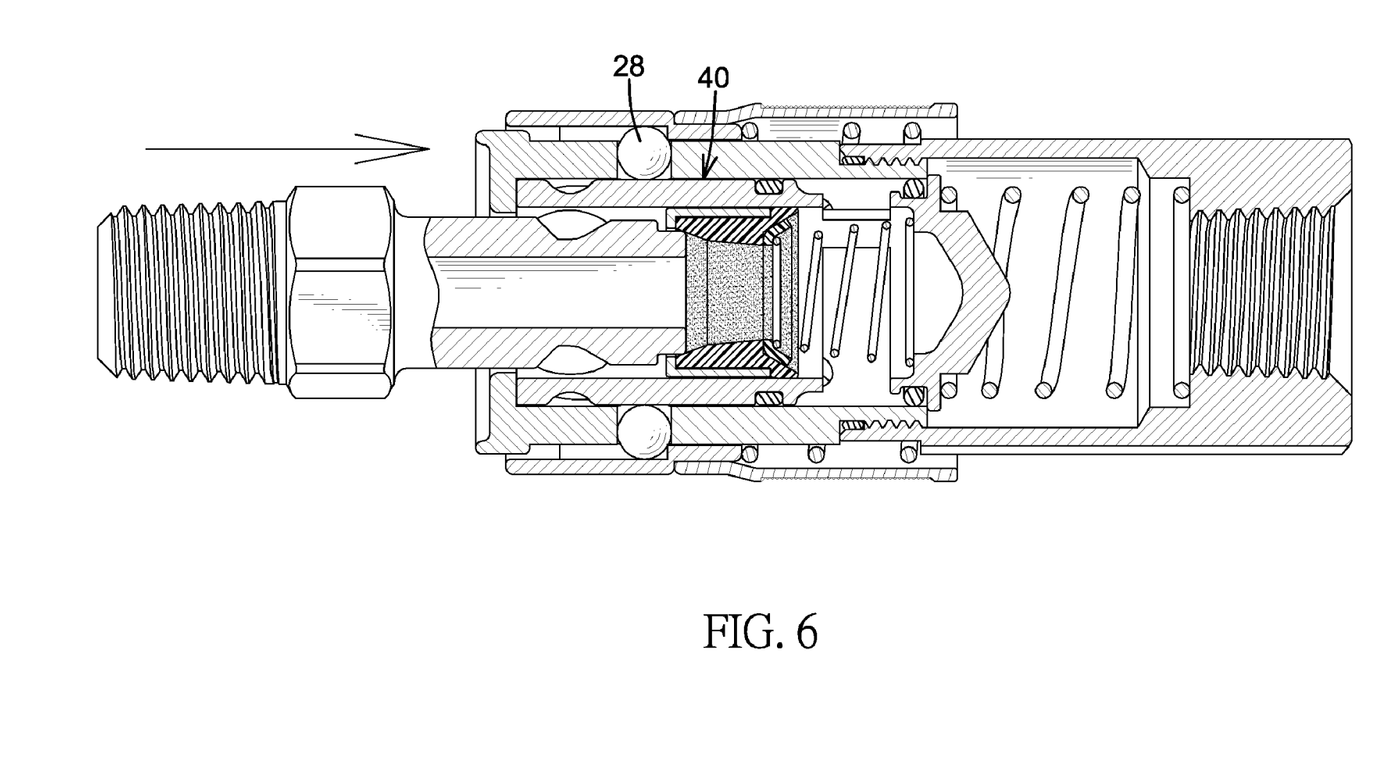
FIG. 6 is another operational side view in partial section of the quick connector in FIG. 1 showing a plug being inserted into the connector but the connecting keeping sealed.

When a plug (60) connected to a tool is inserted into the open end (401) of the moving base (40) via the inserting hole in the socket base (20), with reference to FIGS. 5 and 6, the inserted end (610) of the plug (60) will abut and push against the central hole in the first seal (51) to move the whole pushing assembly (50) inside the base chamber of the moving base (40). When the pushing assembly (50) is moved, the first balls (27) will move along the ball slots (24) and enter the base chamber and abut the plug (60) to engage recesses (612) in the plug (60). When the first balls (27) enter the base chamber via the ball holes (45), the outer sleeve (30) will be moved toward the inserting end (201) of the socket base (20) by the force provided by the third spring (19). Consequently, the first balls (27) abut the inner surface of the central hole (32) of the outer sleeve (30) and are squeezed between inner surface of the central hole (32) of the outer sleeve (30) and the plug (60).

During the first insertion stage, the moving base (40) is still kept stationary, so the sealing effect provided by the sealing flange (41) to the pressured air still works. Furthermore, the pressure of the pressured air also provides the sealing flange (41) on the moving base (40) a force for abutting against the connecting end (200) of the socket base (20), so leakage of the pressured air is completely prevented.

Figure 7:
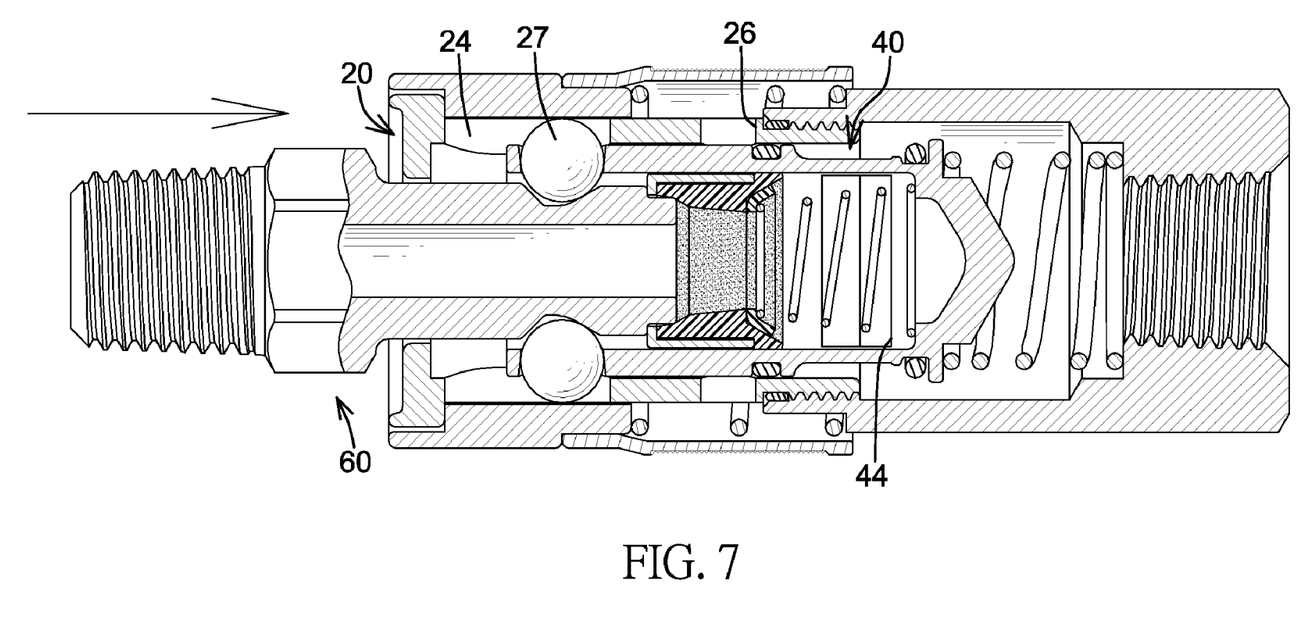
FIG. 7 is an operational side view in partial section of the quick connector in FIG. 1 showing a plug being further inserted into the connector and the connecting being unsealed.
Figure 8:
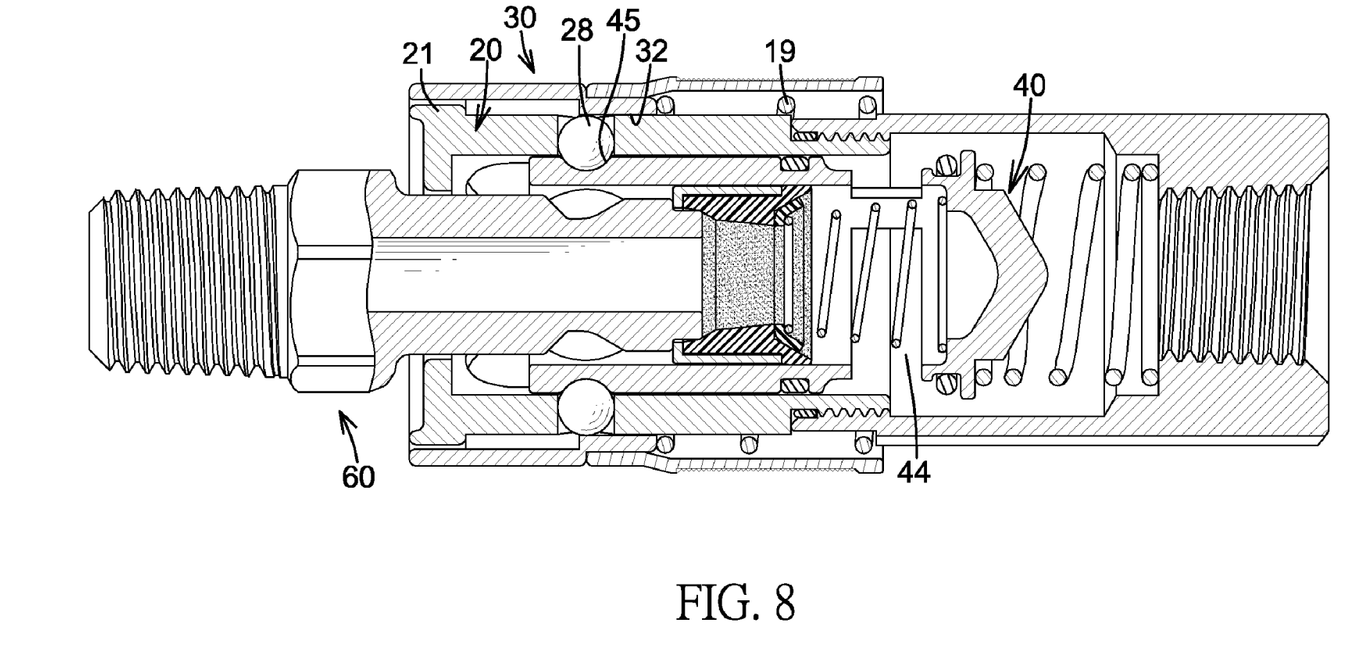
FIG. 8 is another operational side view in partial section of the quick connector in FIG. 1 showing a plug being further inserted into the connector and the connecting being unsealed.

With reference to FIGS. 7 and 8, when the plug (60) is further inserted, the moving base (40) will be moved relative to the socket base (20) due to the abutment of the first balls (27) with the ball holes (45). Consequently, the sealing flange (41) will leave the position where closes the connecting end (200) of the socket base (20) to allow the pressured air to flow into the base chamber via the connecting end (200) of the socket base (20) and the vents (44). Then, the pressured air will flow into the tool connected with the plug (60) via the pushing device (50) and the plug (60). Because the plug (60) has been engaged the first balls (27) and the first balls (27) will not escaped from the plug (60), the plug (60) is not detached from the connector unintentionally even when the plug (60) has not been completely inserted into and connected with the connector. To connect the plug (60) with the connector is easy, non-laborious and save.

Additionally, if the pressure of the air is over a predetermined level, the air will be released from the releasing holes (26) in the socket base (20).

When the plug (60) is further inserted to a position where the annular groove (45) in the moving base (40) aligns with the second balls (28), the second balls (28) will escape from the ball recesses (320) and enter and engage the annular groove (45). The second balls (28) are squeezed between the inner surface of the central hole (32) in the outer sleeve (30) and the peripheral wall of the moving base (40). Consequently, the outer sleeve will keep moving toward the inserting end (201) of the socket base (20) and hold the outer flange (21) on the socket base (20) inside the ball cavity (31). With the balls (27,28) being squeezed, the plug (60) and the moving base (40) are kept from moving such that the plug (60) will not detach or escape from the plug unintentionally.

Figure 9:
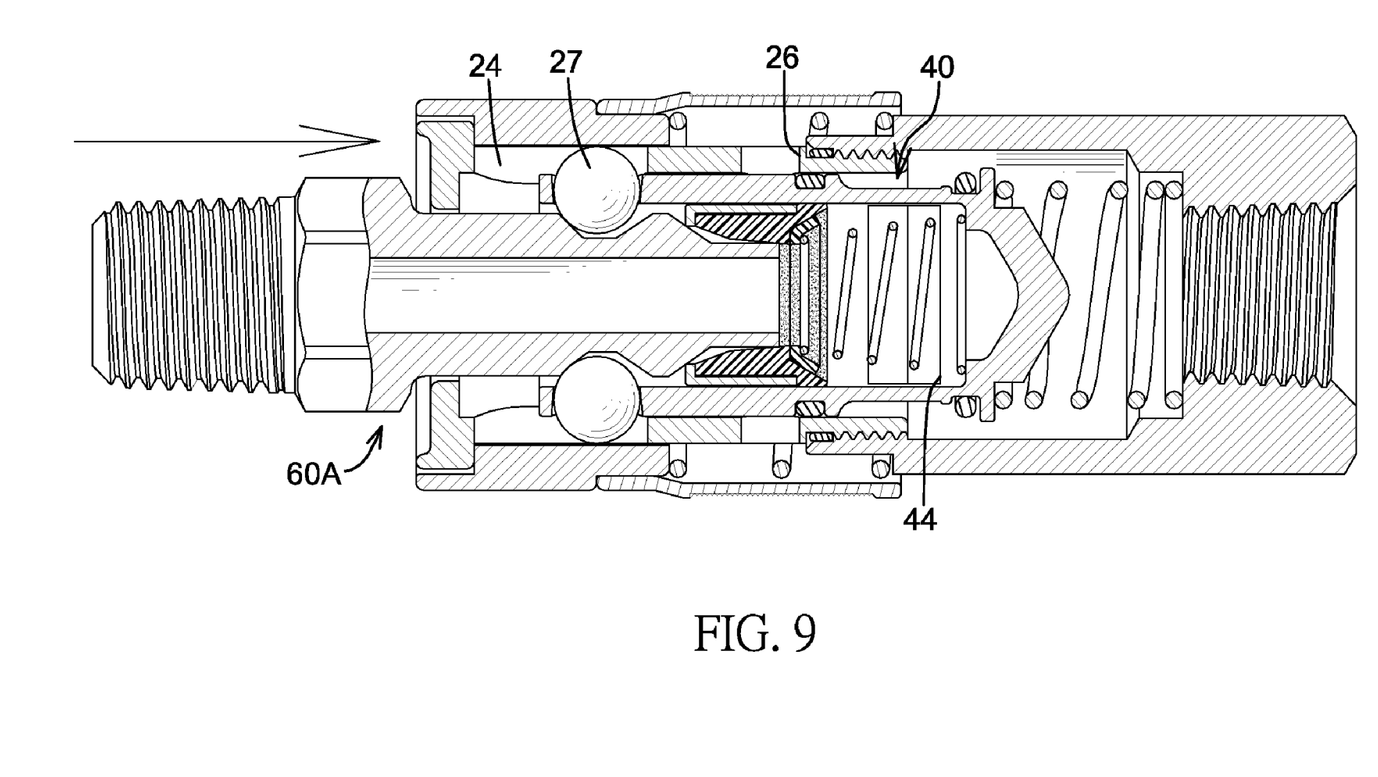
FIG. 9 is a side view in partial section of the quick connector in FIG. 1 showing the connector being applied with a different type of plug.

With reference to FIG. 9, because the first seal (51) has a central hole having different segments with different diameters, the pushing assembly (50) can be applied with different plugs (60A) with different inserted ends and the connector in accordance with the present invention is versatile in use.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A quick connector prior to assembly with a plug, said quick connector comprising:

a tubular body having an open input end, an open output end and a body chamber communicating with the input and output ends;

a socket base being hollow, connected to the tubular body and having
  a peripheral wall having at least one longitudinal flat facet;
  an inserting end;
  a connecting end connected to the output end of the tubular body;
  a socket chamber formed in the socket base and communicating with the inserting and connecting ends;
  an annular lip formed on and protruding inward from the inserting end and having an inserting hole with a diameter;
  multiple elongated ball slots longitudinally formed through the peripheral wall, arranged in a circle around the socket base and communicating with the socket chamber; and
  multiple ball bores formed through the peripheral wall, arranged in a circle around the socket base and communicating with the socket chamber;

a moving base movably mounted in the socket chamber and having
  a peripheral wall;
  a closed end corresponding to the connecting end of the socket base;
  an open end corresponding to and abutting with the annular lip on the inserting end of the socket base;
  a base chamber formed in the moving base and communicating with the open end;
  a sealing flange formed around the closed end and abutting against and closing the connecting end of the socket base;

an annular groove defined around the peripheral wall of the moving base;

multiple ball holes defined through the peripheral wall of the moving base, communicating with the base chamber and corresponding respectively to the ball slots in the socket base; and at least one vent defined through the peripheral wall at a position between the sealing flange and the open end of the moving base and communicating with the base chamber;

a pushing assembly movably mounted in the base chamber of the moving base and comprising a collar movably mounted in the base chamber and having an abutting end abutting with the lip on the socket base; and a first seal being tubular and resilient and mounted in the collar;

an outer sleeve slidably mounted around the socket base and comprising a central hole defined through the outer sleeve and having a diameter and an inner surface;

a ball cavity defined in one end of the outer sleeve, corresponding to the ball slots in the socket base and having a diameter larger than that of the central hole of the outer sleeve; and multiple elongated ball recesses longitudinally formed in the inner surface of the central hole, communicating with the ball cavity and corresponding respectively to the ball bores in the socket base;

a first spring mounted in the tubular body and having two ends abutting respectively with the tubular body and the moving base;

a second spring mounted in the moving base and having two ends abutting respectively with the moving base and the pushing assembly;

a third spring having two ends abutting respectively with the tubular body and the outer sleeve;

multiple first balls each held in one of the ball slots in the socket base and a corresponding one of the ball holes in the moving base and abutting the collar; and multiple second balls held respectively in the ball bores in the socket base and abutting the peripheral wall of the moving base.

2. The quick connector as claimed in claim 1, wherein
the annular groove in the moving base is defined near the open end and has a bottom; and
the ball holes are defined in the bottom of the annular groove.

3. The quick connector as claimed in claim 2, wherein the socket base further comprises at least one releasing hole defined through the peripheral wall of the socket base and communicating with the socket chamber.

4. The quick connector as claimed in claim 3, wherein
the socket base further comprises an outer flange formed around the inserting end; and
the ball slots are defined near the outer flange.

5. The quick connector as claimed in claim 4, wherein
the collar of the pushing assembly has a diameter and further comprises an annular abutting lip formed on and protruding inward from the abutting end to define a hole with a diameter; and
the diameter of the inserting hole in the socket base is larger than that of the hole in the collar but is smaller than that of the collar.

6. The quick connector as claimed in claim 5, wherein the first seal of the pushing assembly has a central hole having multiple segments with different inner diameters and a front end abutting against the abutting lip on the collar.

7. The quick connector as claimed in claim 6, wherein the pushing assembly further comprises a second seal being resilient and attached to a rear end of the first seal; and
the second seal has an inner diameter different from the diameters of the central hole of the first seal.

8. The quick connector as claimed in claim 1, wherein the socket base further comprises at least one releasing hole defined through the peripheral wall of the socket base and communicating with the socket chamber.

9. The quick connector as claimed in claim 1, wherein
the socket base further comprises an outer flange formed around the inserting end; and
the ball slots are defined near the outer flange.

10. The quick connector as claimed in claim 1, wherein
the collar of the pushing assembly has a diameter and further comprises an annular abutting lip formed on and protruding inward from the abutting end to define a hole with a diameter; and
the diameter of the inserting hole in the socket base is larger than that of the hole in the collar but is smaller than that of the collar.

11. The quick connector as claimed in claim 1, wherein the first seal of the pushing assembly has a central hole having multiple segments with different inner diameters.

12. The quick connector as claimed in claim 11, wherein the pushing assembly further comprises a second seal being resilient and attached to a rear end of the first seal; and
the second seal has an inner diameter different from the diameters of the central hole of the first seal.

* * * * *